United States Patent [19]
Heimüller et al.

[11] Patent Number: 6,101,307
[45] Date of Patent: Aug. 8, 2000

[54] PLUG FOR OPTICAL FIBER CABLES AND SOCKET PART FOR SUCH PLUGS

[75] Inventors: Hans-Jost Heimüller, Dudenhofen; Roland Birnbaum, Aalen, both of Germany

[73] Assignee: Siemens Aktiengesellschaft, Munich, Germany

[21] Appl. No.: 09/058,697

[22] Filed: Apr. 10, 1998

[30] Foreign Application Priority Data

Apr. 10, 1997 [DE] Germany .................... 197 14 969

[51] Int. Cl.[7] .................................................. G02B 6/36
[52] U.S. Cl. ........................ 385/139; 385/53; 385/76; 385/77; 385/88
[58] Field of Search ................ 385/139, 92, 94, 385/53, 76–77, 86–89, 90

[56] References Cited

U.S. PATENT DOCUMENTS

| | | | |
|---|---|---|---|
| 4,779,950 | 10/1988 | Williams | 385/58 |
| 4,848,866 | 7/1989 | Feulner et al. | 350/96.2 |
| 5,202,949 | 4/1993 | Hileman et al. | 385/134 |
| 5,708,745 | 1/1998 | Yamaji et al. | 385/92 |
| 5,909,526 | 6/1999 | Roth et al. | 385/78 |
| 5,915,058 | 6/1999 | Clairardin et al. | 385/77 |
| 5,970,193 | 10/1999 | Stratton et al. | 385/89 |

FOREIGN PATENT DOCUMENTS 61-184503   8/1986   Japan .

*Primary Examiner*—John D. Lee
*Assistant Examiner*—Michelle R. Connelly-Cushwa
*Attorney, Agent, or Firm*—Herbert L. Lerner; Laurence A. Greenberg; Werner H. Stemer

[57] ABSTRACT

A plug for an optical fiber cable includes an elastic cover cap which is seated at a light exit side of the plug and has a base that is penetrated by the optical fiber cable during insertion into a socket part. The elastic cover cap serves as a sealing and protective element. Upon insertion of the plug into a socket part, the cover cap remains seated on the plug. In the course of plugging in, the cover cap is gripped by a step in a holding bore of the socket part and is displaced on the plug. In this process, the cover cap base is torn open and exposes a coupling surface of the optical fiber cable.

17 Claims, 4 Drawing Sheets

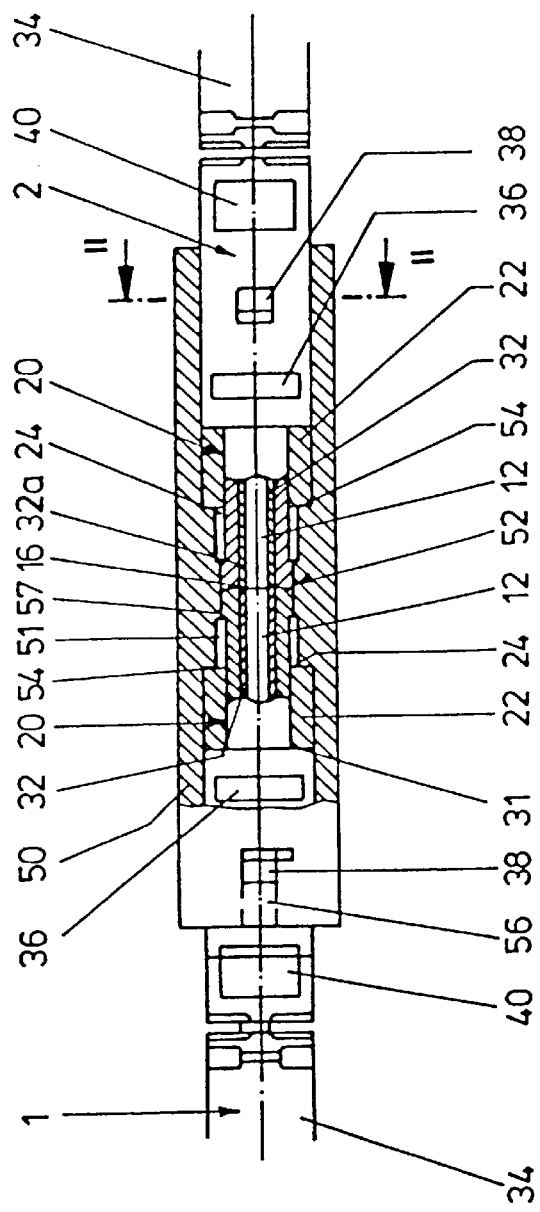
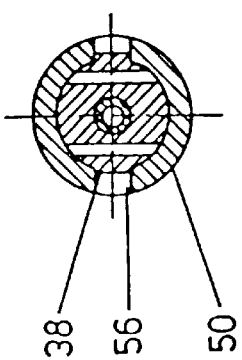
Fig. 2
Fig. 2a

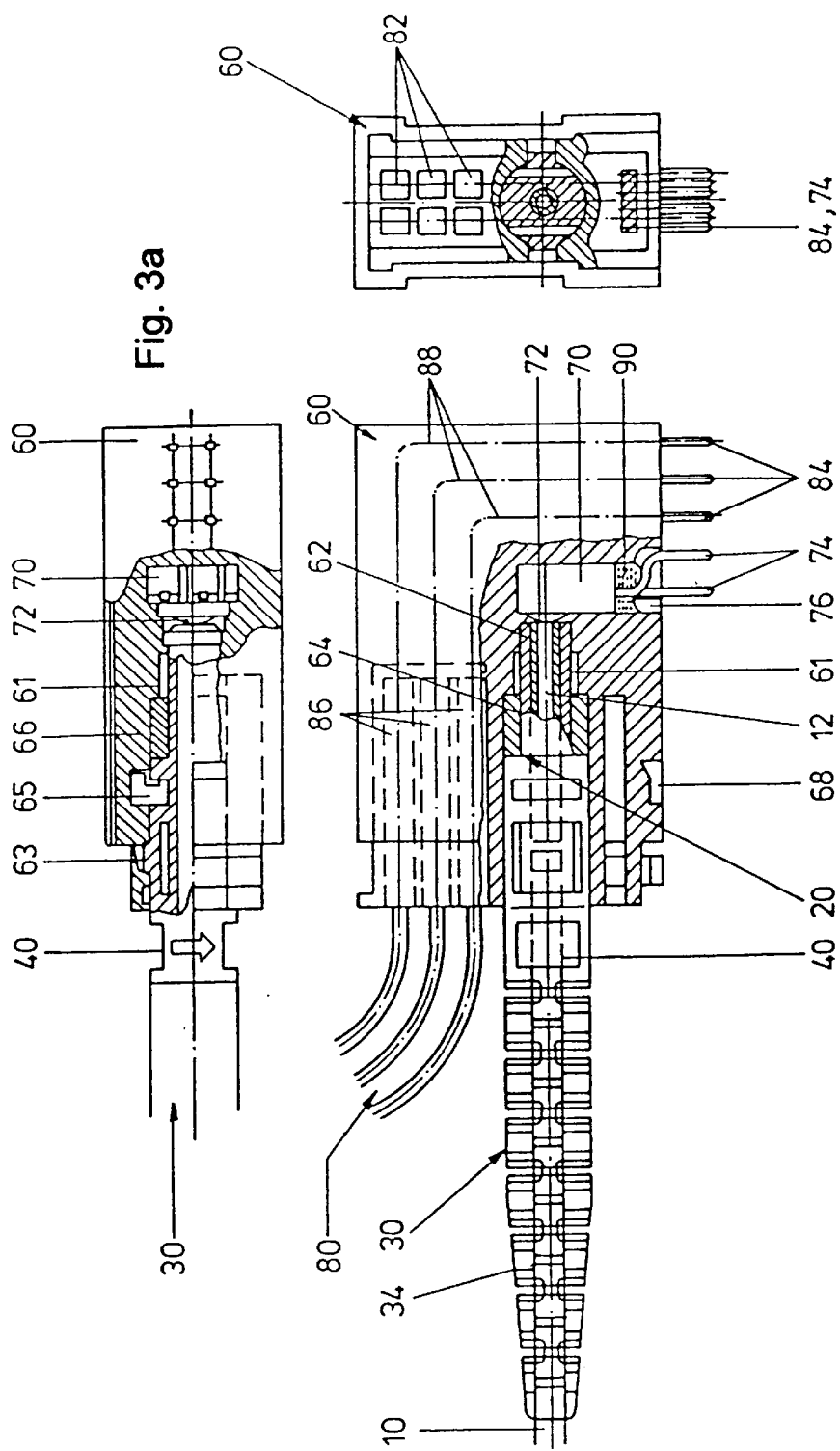

PLUG FOR OPTICAL FIBER CABLES AND SOCKET PART FOR SUCH PLUGS

BACKGROUND OF THE INVENTION

Field of the Invention:

The invention relates to a plug for optical fiber cables, having an optical fiber cable seated in a plug tube, as well as a cover cap seated on a light exit side of the plug. The invention also relates to a socket part into which such a plug can be inserted.

A plug for optical fiber cables is described, for example, in German Utility Model G 90 10 357.2. The plug has a plug tube, which is penetrated coaxially by a holding bore into which the optical fiber cable is inserted. A cable duct tapers inside the plug tube toward an end surface in three sections having diameters which correspond to diameters of an outer sheath, of an inner sheath and of a fiber core of the optical fiber cable. The plug tube is injected from plastic in one piece and has a cylindrical basic body which merges at an end surface into a centering pin and which tapers to a plug pin. Only the optical fiber remains seated in the plug pin.

Optical fiber cables having plugs are being used evermore frequently as communication cables. In the meantime, optical fiber cables having plugs are being used as connecting cables between devices processing optical signals, such as compact disc players and digital audio tape recorders, for example. Moreover, experiments are being conducted in motor vehicles with regard to communication by individual components through optical signals. For that purpose, the necessary control and receiving units have optical IN/OUT connections that include, for example, a plug socket in which an optical fiber cable terminates inside the device. The connection between such devices is performed through the use of an optical fiber cable having two plugs which are fitted at the end and can be used to produce a plug-in connection in a plug receptacle or in a holding bore of a socket part.

A high mechanical stability of the plug-in connection is essential to enable signals to be transmitted largely free from loss and interference. Moreover, it is mandatory that the coupling surface, that is to say the light exit or light entrance side of the optical fiber plug, is not contaminated, scratched or the like, because otherwise disadvantages occur in the signal transmission characteristic of the optical fiber. That can go so far that it is no longer possible at all to transmit optical signals.

It is therefore necessary for the coupling surface of the optical fiber plug to be effectively protected against moisture and contamination starting from the finished processing of the complete plug and during transportation and laying up to plugging into a socket part. Moreover, the tight plug-in connection is required for some applications of such an optical fiber plug.

In order to fulfill those conditions, it has been customary in the interim to push a cover cap onto the plug side of such an optical fiber plug for the purpose of protection during transportation. The cover cap is pulled off and subsequently thrown away after transportation. Special head or radial seals are used for sealing in the case of such known optical fiber plugs.

SUMMARY OF THE INVENTION

It is accordingly an object of the invention to provide a plug for optical fiber cables and a socket part for such plugs, which overcome the hereinafore-mentioned disadvantages of the heretofore-known devices of this general type, in which the plug has a coupling surface that is effectively protected against moisture and contamination and in which the plug is able to achieve a tight plug-in connection upon insertion into a socket part or a mating plug.

With the foregoing and other objects in view there is provided, in accordance with the invention, in a plug for receiving an optical fiber cable, for insertion into a socket part, and having a light exit side, the improvement comprising a plug tube for receiving the optical fiber cable; and a cover cap formed of elastic material and seated on the light exit side, the cover cap having a cover cap base to be penetrated by a front end surface of the optical fiber cable during insertion into the socket part.

In accordance with another feature of the invention, the plug tube has a region of reduced diameter toward the plug side, which has a greater axial length than the cover cap, and the cover cap is slipped over the front end of this region.

In accordance with a further feature of the invention, the extension is a cladding coaxially surrounding the optical fiber cable and having an outer lateral surface with an end facing the light exit side, the end having an annularly projecting shoulder.

In accordance with an added feature of the invention, the extension of reduced diameter is integrally formed in one piece on the plug tube.

In accordance with an additional feature of the invention, the plug tube has at least one locking nose, or at least one recess or groove for a secondary lock, or at least one key surface for applying an unlocking tool or an anti-kink region toward a cable exit side.

The configuration of the base of the cover cap is essential in the plug for an optical fiber cable according to the invention. To be precise, the cover cap base is configured in such a way that it tears open while being loaded at defined sites. As a result, the optical fiber cable can penetrate the cover cap base when it is pressed in the direction thereof when the cover cap is restrained, with the torn open cover cap surface fitting closely around the optical fiber cable because of its elastic configuration.

With the objects of the invention in view there is also provided a socket part for a plug, comprising a holding bore for the plug, the holding bore having at least one annular step for holding the cover cap upon insertion of the plug.

Thus, in accordance with the invention a cover cap made from elastic material is pushed onto the plug-in side of the plug after the final processing of the coupling surface of the optical fiber cable. The base of the cover cap is configured in this case in such a way that it tears open while being loaded at defined sites. When the optical fiber plug is plugged into a holding bore of a suitable socket part, by contrast with the disposable caps used so far, the cover cap remains on the plug. When the plug is inserted into the holding bore of the socket part, the cover cap is gripped by the above-mentioned step in the holding bore and is displaced relatively on the plug in the direction of the cable exit side. In this process, the cover cap base tears open and exposes the coupling surface. Toward the end of the plug-in operation, the cover cap is compressed in the axial direction and thereby seals the plug toward the socket part. When the plug-in connection is disconnected, the cover cap that is torn open at its base remains in the position which is reached and serves only as a seal. In order for the cover cap to actually be withdrawn from the socket part upon disconnection of the plug-in connection, the plug tube has an outer lateral surface on its front end. The outer lateral surface has an outwardly projecting shoulder through the use of which the cover cap can be driven when the plug is withdrawn from the holding bore of the socket part.

In accordance with another feature of the invention, the holding bore has another annular step, and the other annular step is disposed deeper in the socket part than the at least one annular step, as seen in a plug-in direction, and further tapers the holding bore.

In accordance with a further feature of the invention, there is provided a symmetrical body, the holding bore continuously passing through the body for insertion of a plug from each of two opposite sides.

In accordance with an added feature of the invention, there is provided an optical transmitting and/or receiving element to be inserted in an opening in the body for optically coupling the element at a light exit and/or entrance side to a plug inserted into the holding bore.

In accordance with an additional feature of the invention, there is provided a transmitting and/or receiving logic circuit accommodated in the opening in addition to the transmitting and/or receiving element.

In accordance with yet another feature of the invention, there is provided a recess for holding a locking nose.

In accordance with yet a further feature of the invention, there is provided a secondary locking element for hooking or inserting into a recess in the plug.

In accordance with yet an added feature of the invention, there is provided a hybrid body for holding contacts of a conventional plug for electric connections as well as a plug for the optical fiber cable.

In accordance with a concomitant feature of the invention, the particular construction of the plug and of the cover cap has the effect of ensuring that when the plug is pulled the cover cap is drawn back to its original position. Given sufficient elasticity of the cover cap base, the latter is closed again to such an extent that the output surface of the optical fiber is covered at least in a dust-proof manner. As a result, the sensitive optical coupling surface of the optical fiber plug is also protected against contamination when being serviced.

Other features which are considered as characteristic for the invention are set forth in the appended claims.

Although the invention is illustrated and described herein as embodied in a plug for optical fiber cables and a socket part for such plugs, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a partly broken-away, longitudinal-sectional view of a first exemplary embodiment of a socket part which is constructed as a coupling element and into which two plugs according to FIG. 1 can be inserted;

FIG. 2a is a cross-sectional view taken along a line II—II of FIG. 2, in the direction of the arrows;

FIG. 3 is a partly broken-away, plan view of a second exemplary embodiment of a socket part according to the invention, in which the socket part is constructed as a hybrid socket part into which both a plug for optical fiber cables in accordance with FIG. 1 and a conventional plug can be inserted;

FIG. 3a is a side-elevational view of the socket part according to FIG. 3;

FIG. 3b is an end-elevational view of the socket part according to FIG. 3;

DESCRIPTION OF THE PREFERRED EMBODIMENTS

Figure 1:
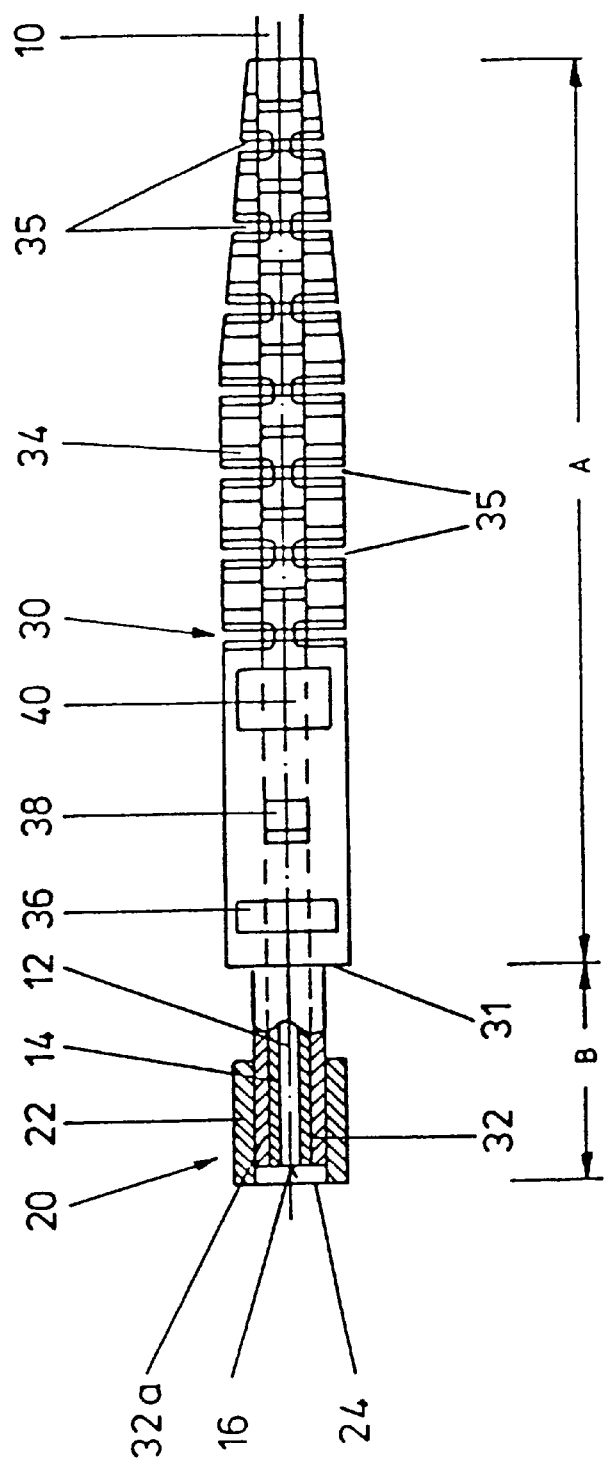
FIG. 1 is a plan view of an exemplary embodiment of a plug according to the invention which is partly broken-away in the region of a plug-in side.

Referring now in detail to the figures of the drawings, in which unless specified otherwise, the same reference symbols denote the same parts with the same significance, and first, particularly, to FIG. 1 thereof, there is seen an example of a plug for optical fiber cables which has a plug tube 30 that is penetrated over its entire axial length by a central through bore. An optical fiber cable 10 which is seated in this through bore has an optical coupling surface 16 or fiber end surface which terminates at least approximately flush with a front end of the plug tube 30.

The plug tube 30, which can be formed, for example, from thermoplastic, has a relatively long grip region A which is adjoined in the direction of the plug-in side of the plug by a tubular extension 32. As FIG. 1 shows, a transition from the grip region A to a region B is bounded by an annular shoulder 31. A ratio of the length of the grip region A to that of the region B is approximately 5:1.

As the partially cut-away view of the plug-in side of the plug shows, the optical fiber cable 10 has a central optical fiber 12 and a cable sheath 14 coaxially surrounding this fiber 12. The cable sheath 14 is coaxially surrounded in turn by the tubular extension 32 of the plug tube 30. The tubular extension 32 of the plug tube 30 has on its front end facing toward the plug-in side an outer lateral surface on which an annular shoulder projects. This annular shoulder is indicated by reference symbol 32a.

A cover cap 20 which is seated on the plug-in side of the plug is formed from an elastic material, for example rubber. The cover cap 20 includes an annular cover cap region 22, which coaxially surrounds both the optical fiber cable 10 and the tubular extension 32 of the plug tube 30. This tubular extension 32 extends over the region indicated by reference symbol B. A cover cap base 24, which is aligned orthogonal to the longitudinal extent of the plug and is connected in one piece to the annular cover cap region 22, has a relatively thin-walled construction. The thickness of the cover cap base 24 is selected in such a way that when the cover cap 22 is restrained it is possible for this cover cap base 24 to be penetrated in a simple way when the plug tube 30 is moved to the left in the representation of FIG. 1.

As the representation of FIG. 1 further shows, the tubular extension 32 of the plug tube 30 has a greater length than the annular cover cap region 22. The reason for this will become clear in conjunction with the explanation of FIGS. 2 and 3.

Although it was mentioned above that the tubular extension 32 is preferably integrally formed in one piece on the plug tube 30, this can also be realized in another suitable way.

The outer lateral surface of the tubular extension 32 is preferably roughened through the use of a type of thread or the like, with the result that the cover cap 22 is held more effectively on the extension 32.

The grip region A of the plug tube 30 also has grooves or recesses 36 for secondary locking hooks of a socket part. Moreover, the grip region A of the plug tube 30 has a preferably sprung locking nose 38. In addition, a key surface 40 to which an unlocking tool can be applied is also present. A region of the plug tube 30 directed toward a cable exit side is provided with an anti-kink part 34 which has notches 35 at regular intervals. The plug tube 30 tapers increasingly toward the cable exit side.

A first exemplary embodiment of a socket part, in which the plug explained above can be used for an optical fiber cable, is represented in FIGS. 2 and 2a. The socket part which is represented is constructed as a coupling element into which a plug configured in accordance with FIG. 1 can be inserted from two opposite sides in each case. The socket part, which is provided with reference symbol 50, has a body with a holding bore 51 running through the entire length of the socket part 50. The body of the socket part 50 is symmetrically shaped, and therefore reference need only be made below to the left-hand part of the socket part 50.

The socket part 50 is distinguished toward the middle by a tapered diameter having two annular steps. The tapered diameter of the holding bore 51 is formed by two annular steps 54, 57 in each of the socket part halves, with the annular step 57 being situated near the middle of the socket part.

The annular step 54 tapers the holding bore 51 of the socket part 50 in such a way that when the plug is inserted into the holding bore 51, the cover cap 20 is restrained, and during a further pushing operation the optical fiber 10 together with the tubular extension 32 penetrates the cover cap base 24 and it is possible to push the plug slightly further. The annular step 57 is selected in such a way that the holding bore 51 has a diameter which corresponds approximately to the outside diameter of the projecting shoulder 32a of the extension 32.

In FIG. 2, two plugs 1 and 2 are located in a desired state inside the socket part 50, that is to say the two plugs 1, 2 touch one another at an end surface with their coupling surfaces. The socket part 50 additionally has insertion grooves 56 into which the above-mentioned locking noses 38 of the plug can be inserted.

As is clearly to be seen from the representation of FIG. 2, the cover cap 20 is at a location set back rearward from the front end of the optical fiber cable or of the tubular extension 32, relative to the cable exit side. To be precise, upon insertion into the holding bore 51 of the socket part 50, the cover cap is restrained on the above-mentioned step 54. The penetrated cover cap 20 encounters a rear stop on the shoulder 31 of the plug tube 30. During extraction of the plug tube 30 from the holding bore 51 of the socket part 50, the annular projecting shoulder 32a of the extension 32 ensures that the penetrated cover cap 20 is driven. In this process, the cover cap is pushed to near its original position. Given sufficient elasticity in the cover cap base, and the fact that lobes thereof fall down, it closes to such an extent that the coupling surface of the optical fiber is sealed at least in a dust-proof manner.

FIGS. 3, 3a and 3b show a further socket part 60, into which the plug of FIG. 1 can be inserted. The socket part 60 is constructed as a hybrid plug-in module housing for holding the plug explained above and for holding a conventional plug which is provided with supply leads 80 and contact pins 86. The contact pins 86 are inserted into contact sockets 82, which are integrated into the hybrid plug-in module housing 60. The contact sockets 82 make contact through electric connections with supply terminals 84, in this case soldered connections. The hybrid plug-in module housing 60 also has a holding bore 61 for holding the plug explained in conjunction with FIG. 1. The holding bore 61 terminates at an end with a fiber centering part 62 which is formed by a wall section corresponding at least approximately to the diameter of the front part of the plug tube 30. Moreover, the holding bore 61 has an annular step 64 on which the cover cap 20 latches in a manner that was already explained, as soon as the plug is pushed into the holding bore 61.

The hybrid body plug-in module housing 60 has a further opening 76 formed therein, in which a transmitting and receiving logic circuit 70 having an integrated transmitting and receiving diode 72 is seated. The transmitting and/or receiving diode 72 is situated directly opposite the coupling surface of the optical fiber 12 of the optical fiber cable 10, with the result that light can be coupled or decoupled optimally. The transmitting and receiving logic circuit 70 is surrounded by a potting compound 90 for reasons of tightness. The transmitting and receiving logic circuit 70 has supply terminals 74, that are likewise soldered connections in this case, which project from the hybrid plug-in module housing 60.

In addition, the hybrid plug-in module housing 60 has a recess 63 into which the locking nose 38 of the plug latches. Furthermore, a secondary locking element 65 is provided which latches in the recess 36 of the plug. Finally, the hybrid plug-in module housing 60 also has a precentering and protective collar 66 for the optical plug.

Figure 4:
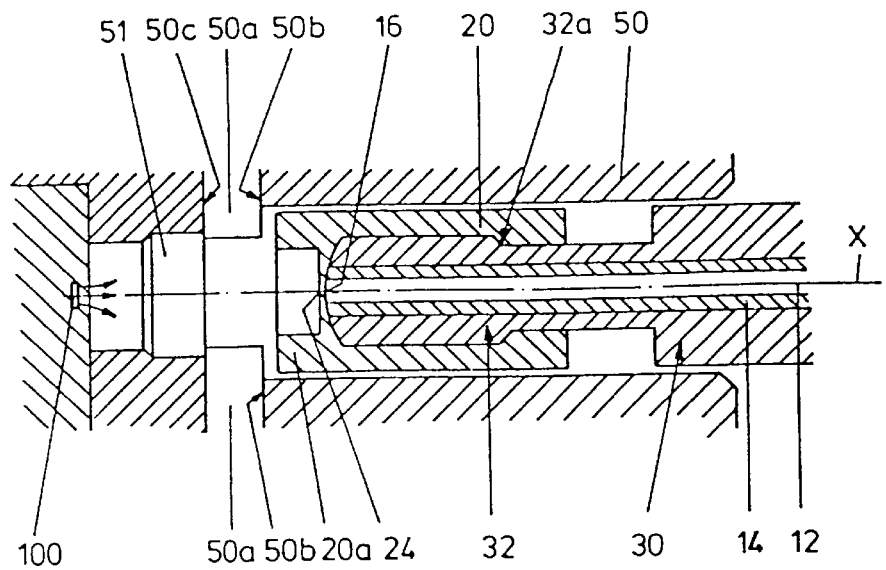
FIG. 4 is a fragmentary, longitudinal-sectional view of a further exemplary embodiment of a plug showing details of the front plug-in region, with the optical fiber not yet completely inserted into a plug tube.
Figure 5:
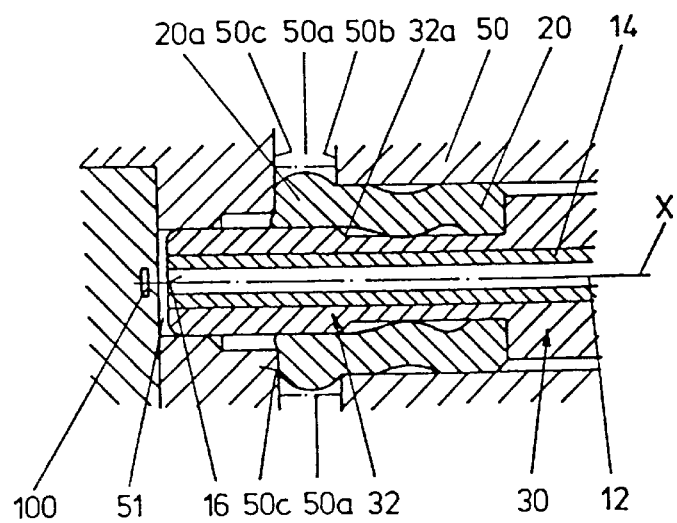
FIG. 5 is a view similar to FIG. 4, but with the optical fiber completely inserted into the plug tube.

A further exemplary embodiment of a plug according to the invention is described in conjunction with FIGS. 4 and 5. In FIG. 4, the plug tube 30 of the optical fiber cable with the optical fiber 12 and the cable sheath together with the front tubular extension 32 that was already described, is not yet completely inserted into the holding bore 51 of the socket part 50. The elastic cover cap 20 which is seated on the tubular extension 32 of the plug tube 30 has a rear part which overlaps the annular shoulder 32a of the tubular extension 32. The elastic cover cap 20 has a front part which encloses the fiber cutting surface 16 of the optical fiber 12 of the optical fiber cable, through the use of its base 24 that is provided for this purpose and is to be penetrated. In contrast with the preceding exemplary embodiments, the elastic cover cap 20 has a shoulder 20a on the edge of the cover cap base 24 projecting annularly in the direction of the plug-in side.

As FIG. 4 shows, the socket part 50 has an annular groove 50a or a partial opening. This annular groove 50a is bounded by two opposite walls 50b, 50c which are aligned orthogonal to the plug-in direction of the optical fiber. The wall 50c is situated deeper in the holding opening 51 of the socket part 50, projecting nearer to a central axis X of the socket part 50. The result of this is that a constriction is formed in the region of the socket part 50 that is situated further inward. The cover cap 20 abuts against the constriction when it is inserted together with the optical fiber cable, and can no longer be pushed further into the interior of the socket part 50.

For the sake of completeness, the exemplary embodiment of FIG. 4 also shows an optical transmitting or receiving element 100 which is to be coupled to the fiber cutting surface 16 of the optical fiber.

In FIG. 5, the optical fiber cable is inserted completely into the holding opening 51 of the socket part 50. The fiber cutting surface 16 is situated directly opposite the optical transmitting or receiving element 100. As the sectional view of FIG. 5 shows, the elastic cover cap 20 is pressed together with its annular shoulder 20a into the annular groove 50a, with the result that the cover cap 20 is restrained in this position. The optical fiber cable itself has penetrated the cover cap base 24 upon being inserted into the holding opening 51.

If the optical fiber cable is withdrawn again from the socket part 50, for example for repair purposes, the plug tube 30 initially moves to the right relative to the cover cap 20, because the cover cap 20 is restrained in the annular groove 50a. This relative movement is maintained until the shoulder 32a has reached the rear end of the elastic cover cap 20, and then drives the cover cap 20. The result is that the cover cap 20 is again located in its initial position, as represented in FIG. 4, on the tubular extension 32 of the plug tube 30. The cover cap base 24 has certainly been penetrated, but given sufficient elasticity it is laid around the front fiber end surface 16 of the optical fiber cable, thus ensuring a termination which is at least dust-proof.

We claim:

1. In a plug for receiving an optical fiber cable, for insertion into a socket part, and having a light exit side, the improvement comprising:

a plug tube for receiving the optical fiber cable; and a cover cap formed of elastic material and seated on the light exit side, said cover cap having a cover cap base to be penetrated by a front end surface of the optical fiber cable during insertion into the socket part.

2. The plug according to claim 1, wherein said plug tube includes a tubular extension facing a front plug side and having a distal end and a reduced diameter, said extension having a greater axial length than said cover cap, and said cover cap slipped over said distal end of said extension.

3. The plug according to claim 2, wherein said extension is a cladding coaxially surrounding the optical fiber cable and having an outer lateral surface with an end facing the light exit side, said end having an annularly projecting shoulder.

4. The plug according to claim 2, wherein said extension of reduced diameter is integrally formed in one piece on said plug tube.

5. The plug according to claim 1, wherein said plug tube has at least one locking nose.

6. The plug according to claim 1, wherein said plug tube has at least one recess or groove for a secondary lock.

7. The plug according to claim 1, wherein said plug tube has at least one key surface for applying an unlocking tool.

8. The plug according to claim 1, wherein said plug tube has an anti-kink region toward a cable exit side.

9. In an assembly including a plug having a light exit side, a plug tube for receiving an optical fiber cable, and a cover cap formed of elastic material, seated on the light exit side and having a cover cap base, a socket part for receiving the plug and causing the cover cap base to be penetrated by a front end surface of the optical fiber cable during insertion into the socket part, the socket part comprising:

a holding bore for the plug, said holding bore having at least one annular step for holding the cover cap upon insertion of the plug.

10. The socket part according to claim 9, wherein said holding bore has another annular step, and said other annular step is disposed deeper in the socket part than said at least one annular step, as seen in a plug-in direction, and further tapers said holding bore.

11. The socket part according to claim 9, including a symmetrical body, said holding bore continuously passing through said body for insertion of a plug from each of two opposite sides.

12. The socket part according to claim 11, including an optical transmitting and/or receiving element to be inserted in an opening in said body for optically coupling said element at a light exit and/or entrance side to a plug inserted into said holding bore.

13. The socket part according to claim 12, including a transmitting and/or receiving logic circuit accommodated in said opening in addition to said transmitting and/or receiving element.

14. The socket part according to claim 9, including a recess for holding a locking nose.

15. The socket part according to claim 9, including a secondary locking element for hooking or inserting into a recess in the plug.

16. The socket part according to claim 9, including a hybrid body for holding contacts of a conventional plug for electric connections as well as a plug for the optical fiber cable.

17. The socket part according to claim 9, wherein the cover cap is pushed back into an original position when the plug is withdrawn from the socket part.

* * * * *